United States Patent [19]

Huang

[11] Patent Number: 4,742,714

[45] Date of Patent: May 10, 1988

[54] COMPACT PRESSURE GAUGE

[76] Inventor: Tien-Tsai Huang, No. 4, Lane 30, Wu-Chuan St., Panchio City, Taiwan

[21] Appl. No.: 98,946

[22] Filed: Sep. 21, 1987

[51] Int. Cl.$^4$ .......................... B60C 23/02; G01L 7/16
[52] U.S. Cl. ...................................... 73/744; 73/146.8; 116/34 R
[58] Field of Search ..................... 73/146.8, 744, 146.2, 73/146.3; 116/34 R

[56] References Cited

U.S. PATENT DOCUMENTS

| | | | |
|---|---|---|---|
| 1,400,848 | 12/1921 | Anderson | 73/146.8 |
| 1,430,174 | 9/1922 | Marchus | 73/744 |
| 1,811,326 | 6/1931 | Muller | 73/744 |

Primary Examiner—Donald O. Woodiel
Attorney, Agent, or Firm—Bacon & Thomas

[57] ABSTRACT

A compact pressure gauge includes an outer housing, a rotating shaft journalled on the outer housing, and a tubular member fixed on the outer housing and extending through the outer housing. A pinion and an indicator are secured to the rotating shaft. A movable seal member is disposed sealingly within the tubular member for being forced by air pressure in an article to be measured and is biased by a compression spring, which has intimately coiled turns for being sleeved on a stepped spring seat, to move outwardly. A U-shaped rack member has parallel first and second arms. The first arm extends into the tubular member and is connected to the seal member for being impelled by the seal member. The second arm is provided with a rack meshing with the pinion. In use, the seal member will be pressed to move the rack member and in turn will rotate the rotating shaft by interaction between the pinion and the rack.

4 Claims, 3 Drawing Sheets

COMPACT PRESSURE GAUGE

BACKGROUND OF THE INVENTION

This invention relates to a pressure gauge, and more particularly to a compact pressure gauge.

A conventional pressure gauge generally has a structure similar to that shown in FIG. 1, which has a sector-like member 10. It is difficult to make the sector-like member 1 due to the fact high accuracy is necessary for its small teeth. Furthermore, because of the high accuracy, once dust deposits on the small teeth, undesired errors will be caused in measurement. Therefore, I disclosed an improved pressure gauge in copending U.S. patent application Ser. No. 938,886, as shown in FIG. 2, which replaces the sector-like member with a rack member 20. The rack member 20 has an end portion movable in a tubular member 30, and the opposite end portion thereof is provided with a rack. Although it is easier to make the rack member 20 than the sector-like member 10, the rack member 20 occupies much space.

SUMMARY OF THE INVENTION

It is therefore the main object of this invention to provide a compact pressure gauge with a short rack member.

According to this invention, the pressure gauge includes a generally U-shaped rack member which has generally parallel first and second arms. The first arm extends into a tubular member. The second arm has a rack.

BRIEF DESCRIPTION OF THE DRAWINGS

Other features and advantages of this invention will become apparent from the following detailed description of a preferred embodiment of this invention with reference to the accompanying drawings in which.

DETAILED DESCRIPTION OF THE PREFERRED EMBODIMENT

Figure 2:
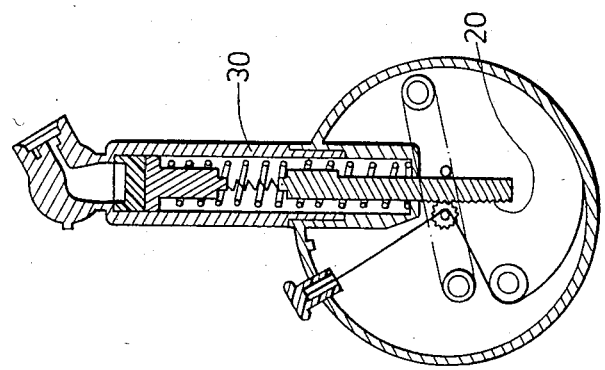
FIG. 2 is a sectional view of another conventional pressure gauge.
Figure 1:
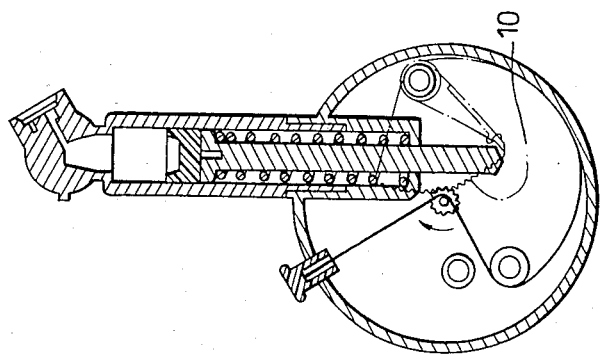
FIG. 1 is a sectional view of a conventional pressure gauge.
Figure 3:
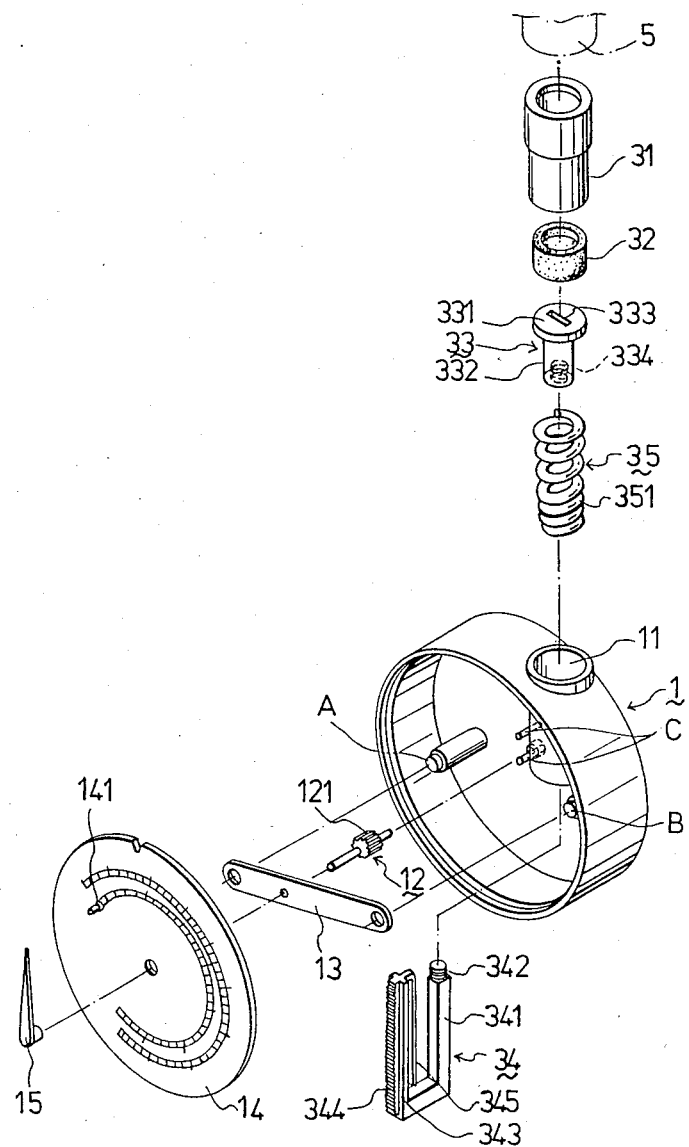
FIG. 3 is an exploded view of a compact pressure gauge according to this invention.
Figure 6:
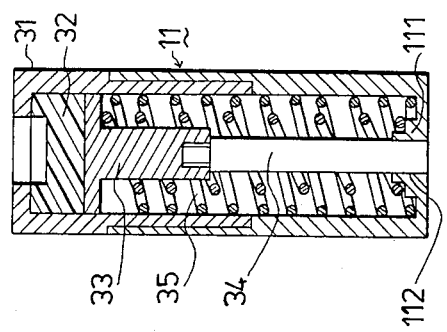
FIG. 6 is a schematic view illustrating how two compression springs are located in the compact pressure gauge.

Referring to FIG. 3, there is shown a compact pressure gauge according to this invention. The compact pressure gauge includes an outer housing 1 and an air pressure cylinder means. The outer housing 1 is formed with a socket 11 having an end wall (see FIG. 5) which includes a stepped cylindrical spring seat 111 and which has an opening 112 passed through the spring seat 111. A central rotating shaft 12 is provided with a pinion 121 fixed thereon and extends through a positioning sheet 13, which is fixed on two support rods A and B for obstructing the pinion 121 from movement while permitting rotation of the pinion 121. Closing the outer housing 1 is an indicating board 14 on which a stop rod 141 is provided for defining the initial position of an indicating needle 15 secured to the outer end of the rotating shaft 12.

The air pressure cylinder means includes a tubular body 31 communicated with a piping 5 which is connected to an article to be measured. Mounted rotatably in the outer end of the tubular body 31 is a seal 32 which acts as a piston. In the tubular body 31, a push rod 33 is screwed to a U-shaped rack member 34 and biased by a compression spring 35 to press against the bottom surface of the seal 32, thereby acting as a piston rod. The push rod 33 has an enlarged head 331 and a cylindrical body 332. The head 331 is formed with a driver hole 333. The cylindrical body 332 has a threaded hole 334. A first arm 341 of the rack member 34 has an externally threaded upper end 342 so that the push rod 33 can be screwed to the rack member 34 by a driver (not shown).

The rack member 34 has a second arm 343 to which a rack 344 is secured. To guide the rack member 34, the first arm 341 of the rack member 34 and the inner end opening 112 of the socket 11 are square. Also, the second arm 343 of the rack member 34 is formed with a guide slot 345, while the outer housing 1 is provided with two guide rods C for being inserted into the guide slot 345.

It is noted that the compression spring 35 has intimately coiled turns 351 at the end adjacent to the spring seat 111. The intimately coiled turns 351 enable the compression spring 35 to be shortened while maintaining its necessary pressure against the push rod 33. When the compression spring 35 is shortened, the push rod 33 can be also shortened. Furthermore, because the rack member 34 is U-shaped, the first arm 341 of the rack member 34 arranged coaxially with the push rod 33 is short. As a result of shortening the push rod 33 and the first arm 341 of the rack member 34, the diameter of the outer housing 1 can be shortened.

Figure 5:
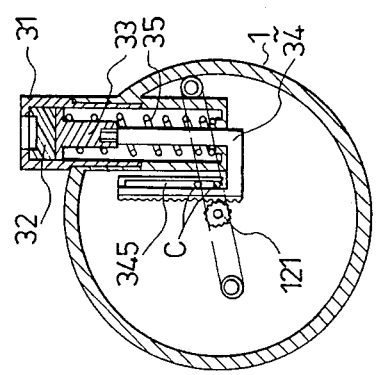
FIG. 5 is a sectional view of the compact pressure gauge when it is not in use.

As illustrated, the compression spring 35 is sleeved on a small diameter portion of the spring seat 111. When increasing the pressure to be measured, as shown in FIG. 5, an additional diameter-increased compression spring 36 can be sleeved on a large diameter portion of the spring seat 111 without the necessity of increasing the length of the first compression spring 35. Certainly, when again increasing the pressure to be measured, the stepped spring seat 111 may be modified to include more different diameter portions in order to locate more springs thereon.

It is understood in the art that a zeroing means is preferably provided. But, because the zeroing means does not form part of this invention, its description is omitted.

When the piping 5 is engaged with the article to be measured, as shown in FIG. 3, the pressure from the inside of the article will be exerted on the seal 32 to push it inwardly. The push rod 33 and hence the rack member 34 will be moved along with the seal 32. At the time of moving the rack member 34, the rotating shaft 12 will be driven to rotate by interaction of the pinion 121 and the rack 344. Thus, the indicating needle 15 can indicate the air pressure in the article.

Figure 4:
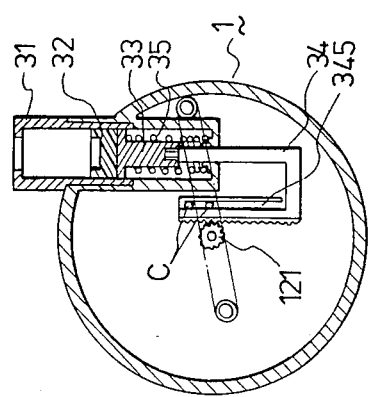
FIG. 4 is a sectional view of the compact pressure gauge when it is in use.

When the article is disengaged from the piping 5, or when the piping 5 is disengaged from the tubular body 31, the seal 32, push rod 33, and rack member 34 are biased by the compression spring 35 to move back to their initial positions, as shown in FIG. 4, thereby permitting the indicating needle 15 to return to zero.

With this invention thus explained, it is apparent that various modifications and variations can be made without departing from the scope and spirit of this invention. It is therefore intended that this invention be limited only as indicated in the appended claims.

I claim:
1. A pressure gauge including:
   an outer housing;
   a tubular member fixed on said outer housing and extending into said outer housing, having an inner end wall with an inner end opening, and an outer end wall with an outer end opening which is adapted to communicate with an interior of a hollow article;
   a rotating shaft journalled on said outer housing and including a pinion fixed on said rotating shaft, and an indicator secured to said rotating shaft for displaying rotational degree of said rotating shaft;
   a movable seal member disposed sealingly in said tubular member for being forced by air pressure in said article;
   a rack member, extending into said tubular member through said inner end opening, connected to said movable seal member for being impelled by said movable seal member, having a rack secured to said rack member and extending out of said tubular member for meshing with said pinion of said rotating shaft; and
   means for guiding said rack member to maintain engagement between said pinion and said rack;
   a spring means for biasing said movable seal member against pressure exerted on said movable seal member;
   characterized by: said spring means being a first compression spring sleeved on said rack member within said tubular member, said first compression spring having one end portion which is remote from said movable seal member and which has intimately coiled turns, so as to increase its pressure against said movable seal member; said inner end wall of said tubular member having a stepped cylindrical spring seat thereon for locating one or more additional compression springs together with said first compression spring in said tubular member to sleeve on said rack member when said air pressure in said article is increased; and said rack member being generally U-shaped having generally parallel first and second arms, said first arm extending into said tubular member, said second arm having said rack secured thereto.

2. A pressure gauge as claimed in claim 1, wherein said guiding means includes:
   said first arm of said rack member being of a rectangular cross-section, and said tubular member being of a well-matched rectangular shape, and
   said second arm of said rack member having a guide slot, and said outer housing having a guide rod disposed slidably in said guide slot.

3. A pressure gauge as claimed in claim 1, wherein said movable seal member is screwed to said first arm of said rack member.

4. A pressure gauge as claimed in claim 3, wherein said movable seal member has an outer end surface which has a driver hole for screwing said movable seal member to said rack member.

* * * * *